US012699619B2

(12) United States Patent
We et al.

(10) Patent No.: US 12,699,619 B2
(45) Date of Patent: Aug. 4, 2026

(54) METHOD AND APPARATUS FOR DIAGNOSING A FAILURE

(71) Applicants: HYUNDAI MOTOR COMPANY, Seoul (KR); KIA CORPORATION, Seoul (KR)

(72) Inventors: Kyoungsoo We, Osan-si (KR); JungMo Koo, Seoul (KR); Hye Yeon Lee, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 120 days.

(21) Appl. No.: 18/537,963

(22) Filed: Dec. 13, 2023

(65) Prior Publication Data

US 2025/0036509 A1 Jan. 30, 2025

(30) Foreign Application Priority Data

Jul. 24, 2023 (KR) ........................ 10-2023-0095948

(51) Int. Cl.
*G06F 11/07* (2006.01)
(52) U.S. Cl.
CPC ........ *G06F 11/079* (2013.01); *G06F 11/0739* (2013.01)
(58) Field of Classification Search
None
See application file for complete search history.

(56) References Cited

U.S. PATENT DOCUMENTS

| | | | |
|---|---|---|---|
| 12,080,108 B1 * | 9/2024 | Volkerink | G07C 5/008 |
| 2020/0174149 A1 * | 6/2020 | Thiruvenkatanathan | |
| | | | G01V 1/282 |
| 2020/0287992 A1 * | 9/2020 | Berg | G06F 11/3452 |
| 2022/0147838 A1 * | 5/2022 | Gu | G06V 20/00 |
| 2022/0335288 A1 * | 10/2022 | Egorova | G06T 7/001 |
| 2022/0397894 A1 * | 12/2022 | Dohi | G05B 23/024 |
| 2023/0059697 A1 * | 2/2023 | Alford | G06N 3/094 |
| 2023/0376746 A1 * | 11/2023 | Woo | G06N 3/048 |
| 2024/0362461 A1 * | 10/2024 | Jain | G06N 3/088 |

* cited by examiner

*Primary Examiner* — Abdulmajeed Aziz
(74) *Attorney, Agent, or Firm* — Lempia Summerfield Katz LLC

(57) ABSTRACT

A method for diagnosing a failure may include collecting sensor signals related to a vehicle in a form of time series data; obtaining a feature classified into a predetermined number of frequency indices by performing a Fourier transform on a predetermined time interval among the time series data; scaling the feature to a value of a predetermined range; generating a graph showing the value depending on a frequency index; generating a heatmap from the graph; training a normal trend figure model that represents trend of data indicating a normal state in the heatmap as a figure; and determining whether there is a failure by calculating a loss for a sensor data input based on the normal trend figure model.

20 Claims, 14 Drawing Sheets

FIG. 2

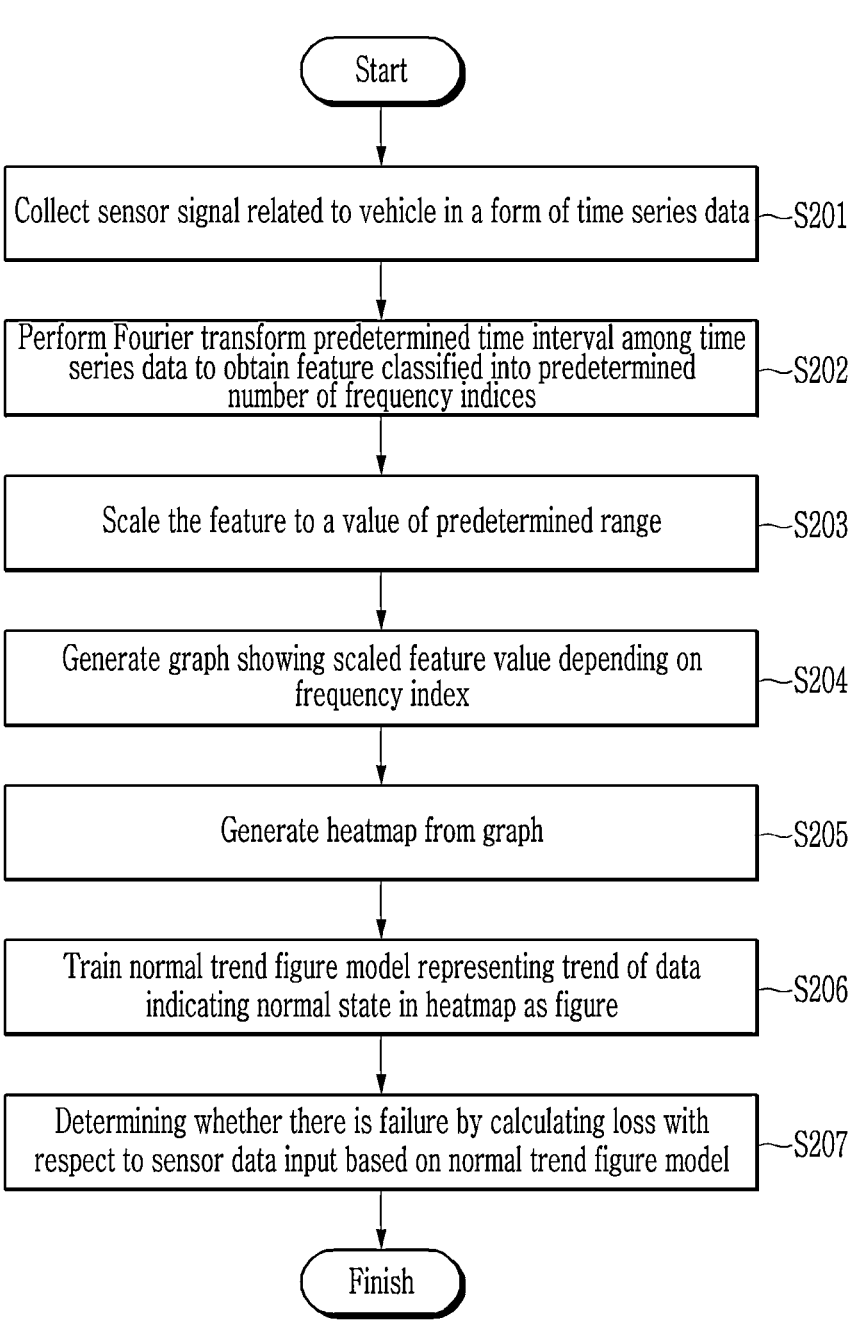

Start

Collect sensor signal related to vehicle in a form of time series data —S201

Perform Fourier transform predetermined time interval among time series data to obtain feature classified into predetermined number of frequency indices —S202

Scale the feature to a value of predetermined range —S203

Generate graph showing scaled feature value depending on frequency index —S204

Generate heatmap from graph —S205

Train normal trend figure model representing trend of data indicating normal state in heatmap as figure —S206

Determining whether there is failure by calculating loss with respect to sensor data input based on normal trend figure model —S207

Finish

FIG. 3
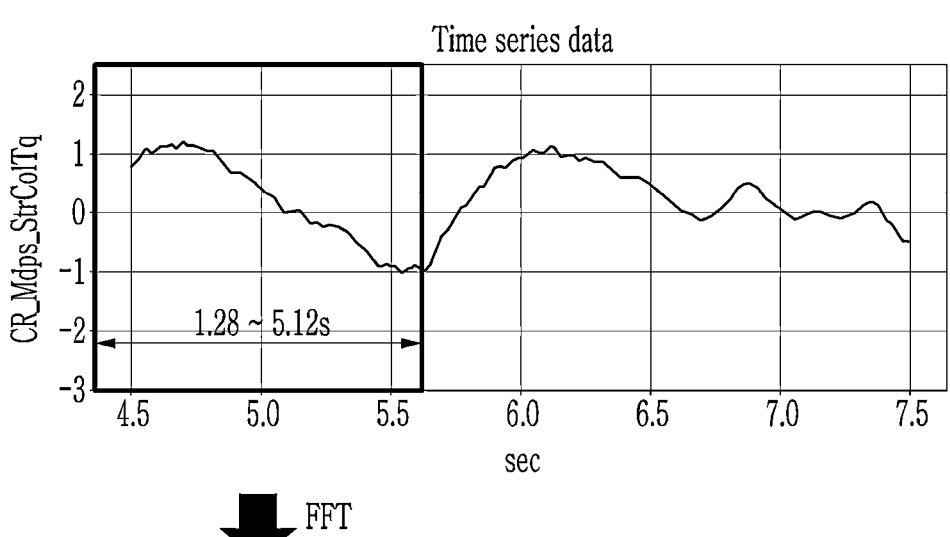
Time series data
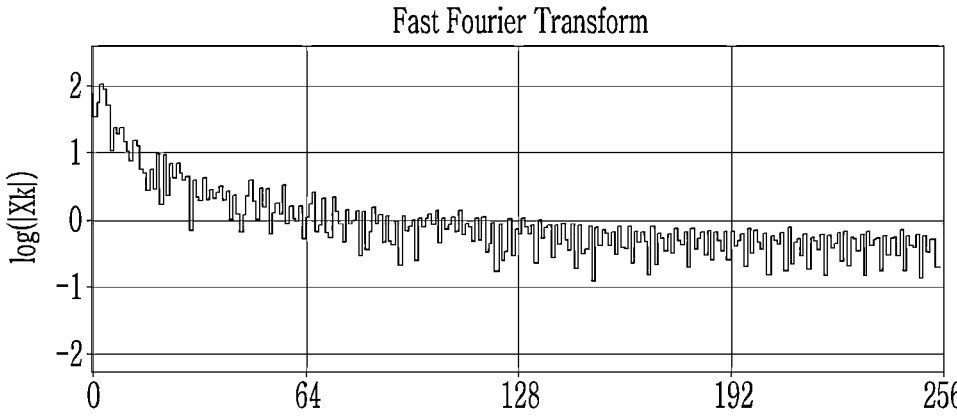
Fast Fourier Transform

FIG. 6
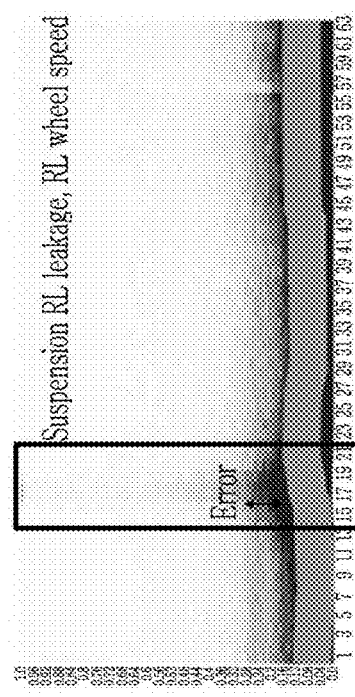
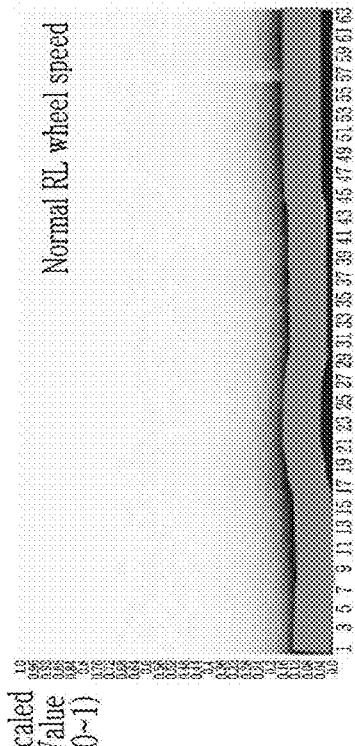

METHOD AND APPARATUS FOR DIAGNOSING A FAILURE

CROSS-REFERENCE TO RELATED APPLICATION

This application claims priority to and the benefit of Korean Patent Application No. 10-2023-0095948, filed in the Korean Intellectual Property Office on Jul. 24, 2023, the entire contents of which is incorporated herein by reference.

TECHNICAL FIELD

The present disclosure relates to a method and an apparatus for diagnosing a failure of a vehicle.

BACKGROUND

Unsupervised learning, which is a method of machine learning, is a learning method for discovering patterns or structures in the absence of correct answers or labels for input data. In an unsupervised learning model, useful information is extracted by self-learning with only given data, so the information may be useful for finding hidden features or inherent structures in data. Techniques, such as clustering and dimensionality reduction, may be used for unsupervised learning. The clustering is the task of grouping data with similar characteristics into the same group, through which patterns or categories of data may be discovered. To perform the clustering, K-means, density-based spatial clustering of applications with noise (DBSCAN), hierarchical clustering, or the like may be used. The dimensionality reduction is a technique that reduces data complexity and facilitates visualization by converting high-dimensional data into a low-dimensional space. Through this technique, noise or unnecessary characteristics may be removed while key information of the data may be maintained. Principal component analysis (PCA), in which t-distributed stochastic neighbor embedding (t-SNE), and autoencoder may be used.

The above information disclosed in this Background section is provided only to enhance understanding of the background of the present disclosure, and therefore it may contain information that does not form the prior art that is already known to a person of ordinary skill in the art.

SUMMARY

The present disclosure provides a method and an apparatus for diagnosing a failure. Specifically, the method and the apparatus may, after configuring a heatmap for each sensor signal of a vehicle, diagnose a failure of a vehicle based on a normal trend figure model that represents a trend of the data as a figure through unsupervised learning by using only data representing normal states.

A method for diagnosing a failure may include collecting sensor signals related to a vehicle in a form of time series data. The method for diagnosing the failure may also include obtaining a feature classified into a predetermined number of frequency indices by performing a Fourier transform on a predetermined time interval among the time series data. The method for diagnosing the failure may also include scaling the feature to a value of a predetermined range. The method for diagnosing the failure may also include generating a graph showing the value depending on a frequency index. The method for diagnosing the failure may also include generating a heatmap from the graph. The method for diagnosing the failure may also include training a normal trend figure model that represents trend of data indicating a normal state in the heatmap as a figure. The method for diagnosing the failure may also include determining whether there is a failure by calculating a loss for a sensor data input based on the normal trend figure model.

The normal trend figure model may be represented as a figure having a shape having a uniform thickness and extending along an axis corresponding to the frequency index.

The figure may include a central line extending along the axis corresponding to the frequency index and comprises a peripheral region formed around the central line to have a predetermined width and to extend along the central line.

A first section and a second section may be set along the axis corresponding to the frequency index. The normal trend figure model may be represented as a first figure of a shape having a first thickness in the first section and extending along the axis corresponding to the frequency index. The the normal trend figure model is represented as a second figure of a shape having a second thickness different from the first thickness in the second section and extending along the axis corresponding to the frequency index.

The sensor signals may include sensor signals related to at least one of a wheel speed, a longitudinal acceleration, a lateral acceleration, a vertical direction acceleration, a yaw rate, a roll rate, a pitch rate, a steering wheel angle, a steering wheel angular speed, or a vehicle sound.

Collecting the sensor signals may include collecting the sensor signals through a controller area network (CAN), where the CAN may include at least one of a chassis CAN (C-CAN), a gateway CAN (G-CAN), or a powertrain CAN (P-CAN).

Collecting the sensor signals may include collecting sound generated in the vehicle through a recording device.

Scaling may include converting the feature to have a minimum value of 0 and a maximum value of 1 through minimum-maximum (Min–Max) normalization.

The time series data may include only normal driving data, and the normal trend figure model is trained based on the normal driving data.

The loss may be calculated by a loss function expressed as an equation of $$\begin{cases} 0 & \text{if } |y_i - \hat{y}_i| < \alpha_i \\ e^{10*|y_i - \hat{y}_i|} & \text{otherwise} \end{cases}$$

where, $y_i$ is an output value, $\hat{y}_i$ is a prediction value, and $\alpha_i$ is a predetermined alpha value.

The heatmap may be converted into a graph having a binary color according to a predetermined ratio, and the predetermined alpha value is determined based on the graph.

A first section and a second section may be set along an axis corresponding to the frequency index. The predetermined alpha value may include a first alpha value determined corresponding to the first section and comprises a second alpha value determined corresponding to the second section and different from the first alpha value.

A non-transitory computer-readable medium may store a program or instructions to direct a processor of a computer to perform acts of: collecting sensor signals related to a vehicle in a form of time series data, obtaining a feature classified into a predetermined number of frequency indices by performing a Fourier transform on a predetermined time interval among the time series data, scaling the feature to a value of a predetermined range, generating a graph showing the value based on a frequency index, generating a heatmap from the graph, training a normal trend figure model that represents trend of data indicating a normal state in the heatmap as a figure, and determining whether there is a failure by calculating a loss for a sensor data input based on the normal trend figure model.

An apparatus for diagnosing a failure may include a sensor signal collection module configured to collect sensor signals related to a vehicle in a form of time series data. The apparatus for diagnosing the failure may also include a feature acquisition module configured to obtain a feature classified into a predetermined number of frequency indices by performing a Fourier transform on a predetermined time interval among the time series data. The apparatus for diagnosing the failure may also include a scaling module configured to scale the feature to a value of a predetermined range. The apparatus for diagnosing the failure may also include a heatmap generation module configured to generate a graph showing the value depending on a frequency index and generate a heatmap from the graph. The apparatus for diagnosing the failure may also include a learning module configured to train a normal trend figure model that represents trend of data indicating a normal state in the heatmap as a figure. The apparatus for diagnosing the failure may also include a failure determination module configured to determine whether there is a failure by calculating a loss for a sensor data input based on the normal trend figure model.

The normal trend figure model may be represented as a figure having a shape having a uniform thickness and extending along an axis corresponding to the frequency index.

The figure may include a central line extending along the axis corresponding to the frequency index and may include a peripheral region formed around the central line to have a predetermined width and to extend along the central line.

A first section and a second section may be set along the axis corresponding to the frequency index. The normal trend figure model may be represented as a first figure of a shape having a first thickness in the first section and extending along the axis corresponding to the frequency index. The normal trend figure model may be a second figure of a shape having a second thickness different from the first thickness in the second section and extending along the axis corresponding to the frequency index.

The loss may be calculated by a loss function expressed as an equation of $$\begin{cases} 0 & \text{if } |y_i - \hat{y}_i| < \alpha_i \\ e^{10*|y_i - \hat{y}_i|} & \text{otherwise} \end{cases}$$

where, $y_i$ is an output value, $\hat{y}_i$ is a prediction value, and $\alpha_i$ is a predetermined alpha value.

The heatmap may be converted into a graph having a binary color according to a predetermined ratio, and the predetermined alpha value is determined based on the graph.

First section and a second section may be set along an axis corresponding to the frequency index, and the predetermined alpha value may include a first alpha value determined corresponding to the first section and may include a second alpha value determined corresponding to the second section and different from the first alpha value.

According to an embodiment, after a heatmap for each sensor signal of a vehicle is configured, based on a normal trend figure model that represents a trend of the data as a figure through unsupervised learning by using only data representing normal states, a failure of the vehicle may be diagnosed with high accuracy by using a small memory, and a new type of failure may also be detected. In addition, as a very small-sized model, it is advantageous for mass production, and a failure diagnosis function may be added without the need to separately prepare additional hardware.

BRIEF DESCRIPTION OF THE DRAWINGS

FIG. 2 is a flowchart for explaining a method for diagnosing a failure according to an embodiment.

FIG. 3 is a drawing for explaining a feature acquisition module according to an embodiment.

FIG. 6 is a drawing for explaining a normal trend figure model according to an embodiment.

DETAILED DESCRIPTION

Figure 1:
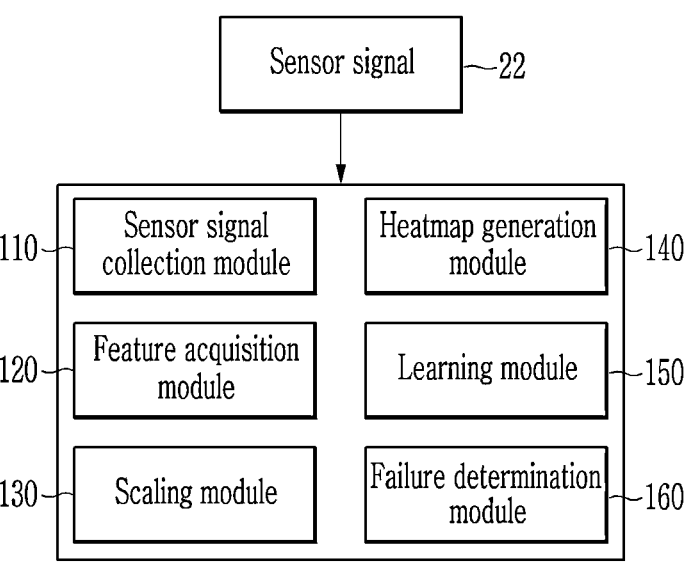
FIG. 1 is a block diagram for explaining an apparatus for diagnosing a failure according to an embodiment.

The present disclosure is described more fully hereinafter with reference to the accompanying drawings, in which embodiments of the present disclosure are shown. As those having ordinary skill in the art should realize, the described embodiments may be modified in various different ways, all without departing from the spirit or scope of the present disclosure. Accordingly, the drawings and description should be regarded as illustrative in nature and not restrictive. Like reference numerals designate like elements throughout the specification.

Throughout the specification and claims, when a part "includes" a certain element, it means that other elements may be further included, rather than excluding other elements, unless otherwise stated. Terms including ordinal numbers such as first, second, and the like are used only to describe various constituent elements and should not be interpreted as limiting these constituent elements. The terms are only used to differentiate one constituent element from other constituent elements.

In addition, terms such as " . . . part," " . . . portion," " . . . er/or," or "module" disclosed in the present specification may mean a unit that may process at least one function or operation described in this specification, and this may be implemented by hardware, software, or a combination thereof. When a " . . . part," " . . . portion," " . . . er/or," "module," or the like of the present disclosure is described as having a purpose or performing an operation, function, or the like, the " . . . part," " . . . portion," " . . . er/or," "module," or the like should be considered herein as being "configured to" meet that purpose or to perform that operation or function. Each of the component, device, element, and the like may separately embody or be included with a processor and a memory, such as a non-transitory computer readable media, as part of the apparatus.

FIG. 1 is a block diagram for explaining an apparatus for diagnosing a failure according to an embodiment.

Referring to FIG. 1, in order to diagnose a failure when a sensor signal of a vehicle deviates from a typical behavior seen in the normal driving, an apparatus 10 for diagnosing a failure according to an embodiment may perform an unsupervised learning only for a normal driving data and may detect abnormal driving based on learning on the normal driving data. Specifically, when the driving behavior of the vehicle is abnormal, for example, when abnormal vibration or noise occurs during the driving of the vehicle, the apparatus 10 for diagnosing a failure may perform failure detection when an occurred failure is not identified. In other words, since the abnormal behavior will be reflected to a sensor data related to the vehicle behavior when a failure occurs in the vehicle, the apparatus for diagnosing a failure may operate to primarily consider as a failure when the vehicle behavior deviates from typical behavior seen in normal driving. The apparatus 10 for diagnosing the failure may also operate to secondarily confirm whether the failure has occurred through detailed inspection of the vehicle. Through this, the apparatus 10 for diagnosing a failure may identify a known failure but may also detect a new failure not yet known, e.g., due to the application of a new technology.

To this end, the apparatus 10 for diagnosing a failure may obtain a feature from the sensor signal related to the vehicle in a characteristic manner. The apparatus 10 for diagnosing the failure may also construct a heatmap therefrom. The apparatus 10 for diagnosing the failure may also diagnose a failure of the vehicle based on a normal trend figure model representing trend of data indicating normal state in the heatmap as a figure. Accordingly, failure diagnosis performance of the apparatus 10 for diagnosing a failure has been found to show excellent determination accuracy with a very small memory usage compared to the case of using autoencoder, generative adversarial network (GAN), 1-Class support vector machine (SVM), which is described below with reference to FIG. 11, FIG. 12, and FIG. 13.

The apparatus 10 for diagnosing a failure may include the sensor signal collection module 110, a feature acquisition module 120, a scaling module 130, the heatmap generation module 140, a learning module 150, and a failure determination module 160.

The sensor signal collection module 110 may collect the sensor signal related to the vehicle in a form of time series data. Here, the time series data is data measured or recorded at regular time intervals (e.g., 100 Hz, 10 ms sampling) and may include a continuous sequence of data points in the order of time. Meanwhile, the sensor signal may be various types of sensor signals that may be sensed with respect to the vehicle. The sensor signal may include, for example, the sensor signal related to at least one of a wheel speed, a longitudinal acceleration, a lateral acceleration, a vertical direction acceleration, a yaw rate, a roll rate, a pitch rate, a steering wheel angle, a steering wheel angular speed, or the vehicle sound.

In some embodiments, the sensor signal may be collected through a controller area network (CAN). CAN communication is a standardized protocol used to transmit data between electronic devices inside the vehicle and may be used for failure diagnosis, error detection, transmission of driving-related data, and the like. In some embodiments, CAN may include at least one of a chassis CAN (C-CAN), a gateway CAN (G-CAN), or a powertrain CAN (P-CAN). The C-CAN may be a CAN bus responsible for communication between components related to the body such as suspension, brake system, and the vehicle stability system. The G-CAN is a central gateway that serves to connect multiple CAN networks in the vehicle, facilitates data transmission and conversion between different CAN networks, and supports integration between the vehicle systems. The P-CAN may be a CAN bus that handles communication between components related to a power transmission system, such as an engine control module, a transmission control module, and a fuel management system.

Meanwhile, in some embodiments, the sensor signal may also be collected through a recording device. In other words, the recording device may be used to collect sound generated in the vehicle.

The feature acquisition module 120 may obtain the feature classified into a predetermined number of frequency indices by performing a Fourier transform on a predetermined time interval among the time series data. The predetermined time interval may be defined by a window spanning a start point and an end point. The feature acquisition module 12 may perform the Fourier transform on raw data included in the window among the sensor signals collected by the sensor signal collection module 110. In addition, the feature acquisition module 12 obtains the feature classified into the predetermined number of frequency indices. At this time, when the number of the time series data included in the window is n (n is an integer greater than or equal to 2), $(n/2-1)$ pieces of data obtained by removing the first index corresponding to the sum of signal values from among $n/2$ pieces of data obtained by removing symmetry from n magnitudes may be set as final data to be used.

The scaling module 130 may scaling the feature obtained by the feature acquisition module 120 to a value of predetermined range. In some embodiments, with respect to the feature value obtained by the feature acquisition module 120, the scaling module 130 may convert the feature to have a minimum value of 0 and a maximum value of 1 through minimum-maximum (Min–Max) normalization.

The heatmap generation module 140 may generate a graph showing the feature value scaled by the scaling module 130 depending on frequency index and may generate the heatmap from the graph. The heatmap, which is adopted to analyze a signal trend for normal driving of the vehicle, is a graphic representation that visualizes the distribution and density of data in color, and the value of each data point may be expressed as the intensity or saturation of the color. Such a heatmap may be generated for each the sensor signal of the vehicle.

The heatmap generation module 140 may discretize the value of the vertical axis, i.e., the scaled value, with respect to the graph obtained after scaling the feature obtained by the feature acquisition module 120 to a value of predetermined range. For example, the vertical axis may be divided into a plurality of sections having the same size, a first value (e.g., 1) may be assigned to a section of the plurality of sections to which the scaling value belongs, and a second value (e.g., 0) may be assigned to a section to which the scaling value does not belong, to generate a first table.

Thereafter, a second table, a third table, . . . , and a k-th table (k is an integer greater than or equal to 2) may be generated by repeating the above-described operation with respect to another feature values obtained based on newly collected data and scaled.

Subsequently, when the first table, the second table, . . . , and the k-th table are superposed, for items where the plurality of sections and the frequency index cross each other in the table, frequency counts of items in the same position of the first table, the second table, . . . , and the k-th table may be summed up. According to the total frequency count calculated as above, the heatmap may be generated by making the item with the highest frequency the darkest and making the remaining items gradually lighter.

In some embodiments, a threshold value may be set in advance in the process of processing items with high frequency counts in the heatmap in bold. For example, the threshold may be set to a value corresponding to n % of k. For example, when k is 10,000 and n is set to 2, the threshold may be determined to be 200. Accordingly, after the frequency counts of items in the same position of the first table, the second table, . . . , and the k-th table are summed up, when the summed frequency count exceeds the threshold value, the heatmap may be generated after replacing the frequency count of the corresponding item with the threshold value. In other words, for example, for items (for example, items of which the frequency count is 210, 204, 212, or the like) of which the summed frequency counts exceed 200, their frequency counts (for example, 210, 204, 212) may be all replaced with 200. Here, the value of n may be defined as an appropriate value according to a specific implementation purpose or implementation environment. In this way, when the threshold value is introduced in generating the heatmap, since a part different from the normal part in the heatmap may be expressed as darkly as possible, it is possible to maximize an error indicating a failure that has not yet been detected.

The learning module 150 may train the normal trend figure model that represents trend of data indicating normal state in the heatmap generated by the heatmap generation module 140 as a figure, by taking the data used for generating the heatmap, i.e., the first table, the second table, . . . , and the k-th table as an input. Here, the normal trend figure model may be a figure in the form of a band having a thickness. When the normal trend figure model is generated by the learning module 150, if there is a lot of data that deviate from the figure, it may be interpreted that the driving behavior of the vehicle is abnormal, or the vehicle is likely to have a failure.

In some embodiments, the normal trend figure model may be represented as a figure having a shape having a uniform thickness and extending along an axis corresponding to the frequency index. In other words, the normal trend figure model may be trained by taking the data used for generating the heatmap generated by the heatmap generation module 140 as training data such that the normal trend figure model may be formed to have the uniform thickness and extend in a horizontal direction. Here, the time series data serving as the training data may include only the normal driving data, and the normal trend figure model may be trained based on the normal driving data.

In some embodiments, the normal trend figure model may include a central line extending along the axis corresponding to the frequency index and may include a peripheral region formed around the central line to have a predetermined width and to extend along the central line. In other words, the normal trend figure model may be trained by taking the data used for generating the heatmap generated by the heatmap generation module 140 as the training data such that the normal trend figure model may be formed to include the central line and the peripheral region and extend in the horizontal direction. The time series data serving as the training data may include only the normal driving data, and the normal trend figure model may be trained based on the normal driving data.

In some embodiments, the normal trend figure model may also be generated to include a plurality of thicknesses. In more detail, a first section and a second section may be set along the axis corresponding to the frequency index. The normal trend figure model may be represented as a first figure of a shape having a first thickness in the first section and extending along the axis corresponding to the frequency index. A second figure of a shape having a second thickness different from the first thickness in the second section and extending along the axis corresponding to the frequency index.

The failure determination module 160 may determine whether there is a failure by calculating a loss with respect to the sensor data input based on the normal trend figure model generated by the learning module 150.

In some embodiments, loss may be calculated by a loss function expressed as the following equation.

$$
\begin{cases}
0 & \text{if } |y_i - \hat{y}_i| < \alpha_i \\
e^{10*|y_i - \hat{y}_i|} & \text{otherwise}
\end{cases}
$$

Here, $y_i$ may be an output value, $\hat{y}_i$ may be a prediction value, and $\alpha_i$ may be a predetermined alpha value. The alpha value may be a value corresponding to a thickness of the peripheral region formed in the normal trend figure model around the central line to have the predetermined width and to extend along the central line. Accordingly, the thickness of the normal trend figure model may be a value obtained by doubling the alpha value. Therefore, the alpha value may be set to an appropriate value to adjust the thickness of the normal trend figure model and may also be used to adjust the boundary between what is determined to be normal and what is determined to be abnormal. The loss function may be used to calculate the error for the data used for generating the heatmap, i.e., the first table, the second table, . . . , and the kth table, and normality or abnormality may be determined based on the average value.

Here, $y_i$ is an expected output value when an arbitrary x is input, and $y_i$ may mean the output value of the predetermined data, i.e., a solution or a ground truth. In addition, $\hat{y}_i$ is a value output when x is input to a learning model, and $\hat{y}_i$ may be referred to as an interference value in the sense that the learning model has made an inference for the input x. Learning may be performed in a direction of reducing the difference between $y_i$ and $\hat{y}_i$. In other words, when the difference between $y_i$ and $\hat{y}_i$ is within $\alpha_i$, the difference $y_i$ and $\hat{y}_i$ may be considered as 0. In general, after learning, the prediction value output from the learning model is directly used to classify a class of objects (e.g., distinguishing a dog from a cat) or to predict a continuous value (e.g., a current speed of the vehicle is predicted). However, according to embodiments, the result output from the learning model is not used as it is, but the result $\hat{y}_i$ of the learning model and the loss of the ground truth $y_i$ are used.

In some embodiments, the alpha value may be a value obtained by extracting the thickness of a portion to be included as a band shape in the heatmap for each signal and taking half of the extracted thickness.

In some embodiments, the heatmap may be converted into a graph having a binary color according to a predetermined ratio, and the alpha value may be determined based on the converted graph.

In some embodiments, the first section and the second section may be set along the axis corresponding to the frequency index. The alpha value may include a first alpha value determined corresponding to the first section and may include a second alpha value determined corresponding to the second section but to be different from the first alpha value.

In other words, an apparatus for diagnosing a failure according to an embodiment may collect the normal driving data, may configure the heatmap for each the sensor signal, may set the alpha value based on the heatmap, and then may perform learning. When learning is completed, the normal trend figure models as many as the number of the sensor signals may be generated. An apparatus for diagnosing a failure may set the threshold for each the sensor signal based on normal test data and then may estimate a loss based on continuous driving data for a specific time unit (e.g., 20 minutes). Thus, "potential failure" may be determined when the loss exceeds the threshold value. Through additional inspection to the vehicle determined as "potential failure", particularly a new type of failure may be identified and diagnosed.

FIG. 2 is a flowchart for explaining a method for diagnosing a failure according to an embodiment.

Referring to FIG. 2, a method for diagnosing a failure according to an embodiment may include a step S201 of collecting the sensor signal related to the vehicle in a form of the time series data. The method for diagnosing the failure may also include a step S202 of obtaining the feature classified into the predetermined number of frequency indices by performing the Fourier transform on the predetermined time interval among the time series data. The method for diagnosing the failure may also include a step S203 of scaling the feature to a value of the predetermined range. The method for diagnosing the failure may also include a step S204 of generating a graph showing the scaled feature value depending on the frequency index. The method for diagnosing the failure may also include a step S205 of generating the heatmap from the graph. The method for diagnosing the failure may also include a step S206 of training the normal trend figure model that represents trend of data indicating normal state in the heatmap as a figure. The method for diagnosing the failure may also include a step S207 of determining whether there is a failure by calculating the loss with respect to the sensor data input based on the normal trend figure model.

For a more detailed description of the method, reference may be made to the description described above with respect to FIG. 1 and the description to be described below with respect to FIG. 3-FIG. 14, and thus duplicate descriptions have been omitted herein.

FIG. 3 is a drawing for explaining a feature acquisition module according to an embodiment.

Referring to FIG. 3, the feature acquisition module 120 may perform the Fourier transform on raw data included in a preset time window among the sensor signals in the form of the time series data collected by the sensor signal collection module 110. For example, referring to an example shown in FIG. 3, with respect to a certain time point t, the end point may be set within the range of t 1.28 seconds and t 5.12 seconds. Here, in the case that the end point is t+1.28 seconds, when the Fourier transform is performed, a total of 128 pieces of data may be included in the time window. The feature acquisition module 12 may obtain features classified into 63 frequency indices. Here, for the frequency index, if there are 128 the time series data included in the window, 63 pieces of data obtained by removing 1st index corresponding to a sum of signal values from 64 pieces of data obtained by removing symmetry from 128 magnitudes may be set as the final data to be used. In the case that the point is t+5.12 seconds, when the Fourier transform is performed, a total of 512 pieces of data may be included in the time window, and from this, the feature classified into 255 frequency indices may be obtained. In the present embodiment, the numbers 1.28 seconds and 5.12 seconds are not intended to limit the scope of the present disclosure and may be altered to other values depending on specific implementation purpose and environment.

Figure 4:
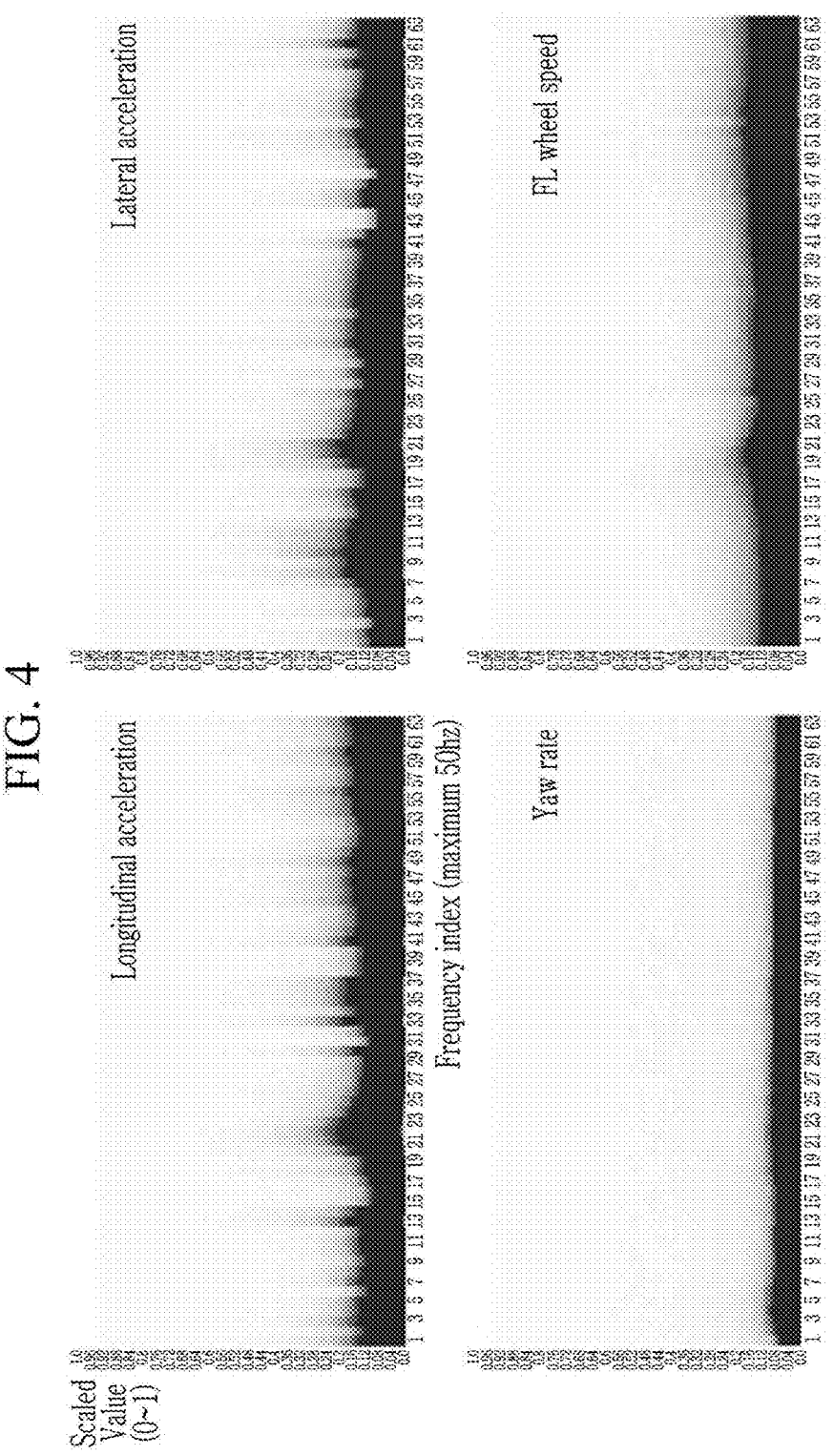
FIG. 4 and FIG. 5 are drawings for explaining a heatmap generation module according to an embodiment.
Figure 5:
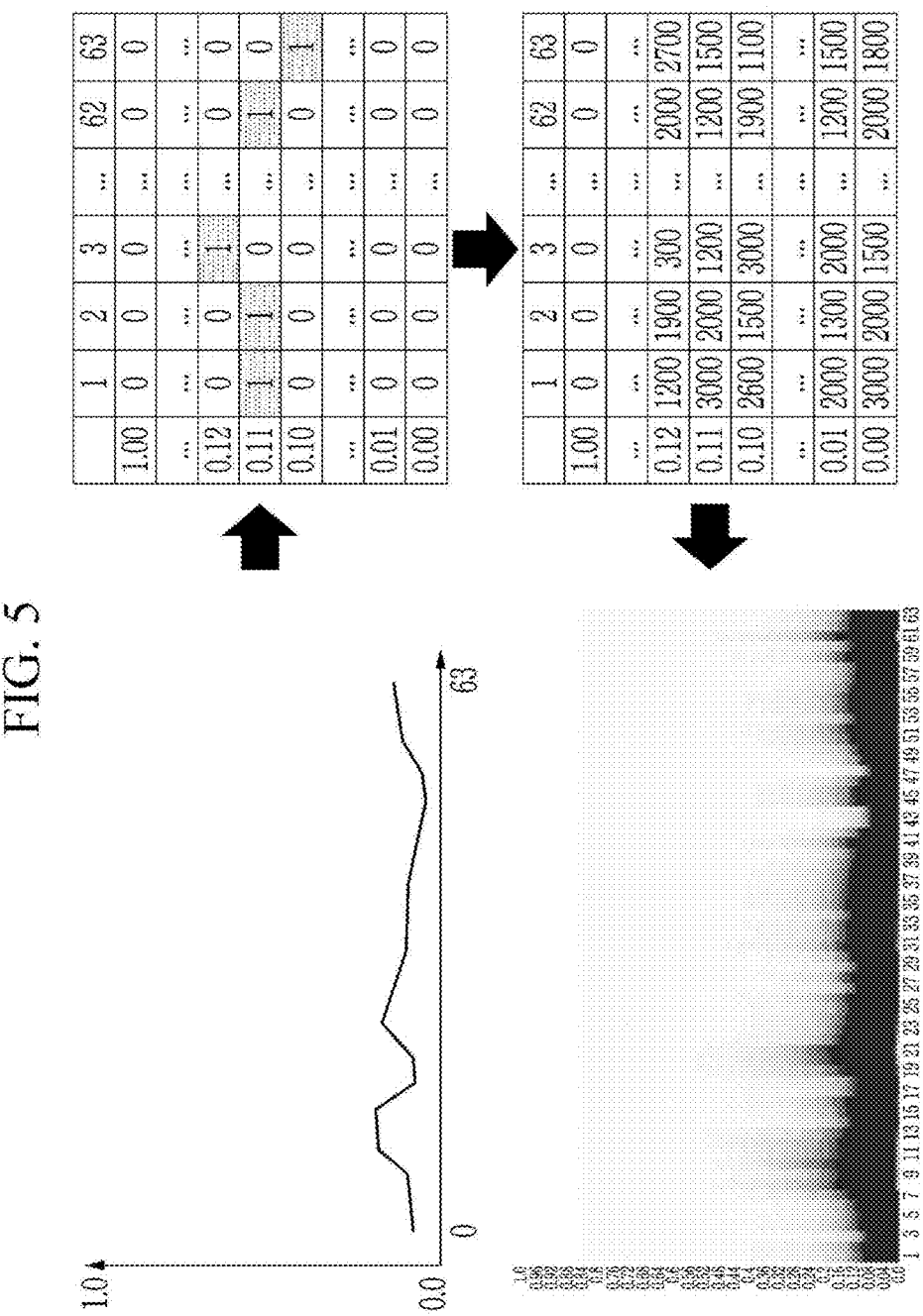

FIG. 4 and FIG. 5 are drawings for explaining the heatmap generation module according to an embodiment.

Referring to FIG. 4, the heatmap generation module 140 may generate the heatmap with respect to the longitudinal acceleration, the heatmap with respect to the lateral acceleration, the heatmap with respect to the yaw rate, and the heatmap with respect to the front-left (FL) wheel speed. In each the heatmap, it may be seen that the feature values are scaled between 0 and 1.

Referring to FIG. 5, the heatmap generation module 140 may discretize the value of the vertical axis, i.e., the scaled value, with respect to the graph obtained after scaling the feature obtained by the feature acquisition module 120 to a value of the predetermined range (the graph shown in the upper left corner in FIG. 5). For example, the vertical axis may be divided into the plurality of sections having the same size, the first value (e.g., 1) may be assigned to a section of the plurality of sections to which the scaling value belongs, and the second value (e.g., 0) may be assigned to a section to which the scaling value does not belong, to generate the first table. For example, the value of the vertical axis corresponding to the frequency index of 1 may be 0.11x (x is an integer), the value of the vertical axis corresponding to the frequency index of 3 may be 0.12x (x is an integer), and the value of the vertical axis corresponding to the frequency index of 63 may be 0.10x (x is an integer). In this case, in a column corresponding to the frequency index of 1, 1 may be assigned to a section indicated by "0.11", and 0 may be assigned to the remaining sections. In the case of a column corresponding to the frequency index of 3, 1 may be assigned to a section indicated by "0.12", and 0 may be assigned to a remaining section. In the case of a column corresponding to the frequency index of 63, 1 may be assigned to a section indicated by "0.10", and 0 may be assigned to a remaining section.

Thereafter, the second table, the third table, . . . , and the k-th table (k is an integer greater than or equal to 2) may be generated by repeating the above-described operation with respect to another feature values obtained based on newly collected data and scaled. For each of these tables, the operation may be performed in the same manner as in generating the first table.

Subsequently, when the first table, the second table, . . . , and the k-th table are superposed, for items where the plurality of sections and the frequency index cross each other in the table, frequency counts of items in the same position of the first table, the second table, . . . , and the k-th table may be summed up. For example, in a column corresponding to the frequency index of 1, the frequency count of the section indicated by "0.11" and "0.00" may be 3000, which is the largest, the frequency count of the section indicated by "0.10" may be 2600, and the frequency count of the section indicated by "0.01" may be 2000, and the frequency count of the section indicated by "0.12" may be 1200. At this time, in a column corresponding to the frequency index of 1, the section indicated by "0.11" and "0.00" may be processed to be darkest, and the remaining items may be processed to be gradually lighter in descending order of values. In addition, in a column corresponding to the frequency index of 2, the frequency count of the section indicated by "0.11" and "0.00" may be 2000, which is the largest, the frequency count of the section indicated by "0.12" may be 1900, the frequency count of the section indicated by "0.10" may be 1500, and the frequency count of the section indicated by "0.01" may be 1300. At this time, in a column corresponding to the frequency index of 2, the section indicated by "0.11" and "0.00" may be processed to be darkest, and the remaining items may be processed to be gradually lighter in descending order of values. When such operation is repeated from the column corresponding to the frequency index of 3 to the column corresponding to the frequency index of 63, the heatmap shown in the lower left corner in FIG. 5 may be finally generated.

FIG. 6 is a drawing for explaining the normal trend figure model according to an embodiment.

Referring to FIG. 6, the heatmap shown in the left side is for the normal rear-left (RL) wheel speed and shows that the normal trend figure model of the shape having the uniform thickness and extending along the axis corresponding to the frequency index is generated by the learning module 150.

The heatmap shown in the right side is for suspension rear-left (RL) wheel leakage rear-left (RL) wheel speed, where the normal trend figure model generated by the learning module 150 shown in the left is overlapped. As indicated by a rectangle, a case in which values having a significant error among values of the heatmap are included at a certain level or more may be interpreted as an abnormality or a possibility of failure.

Figure 7:
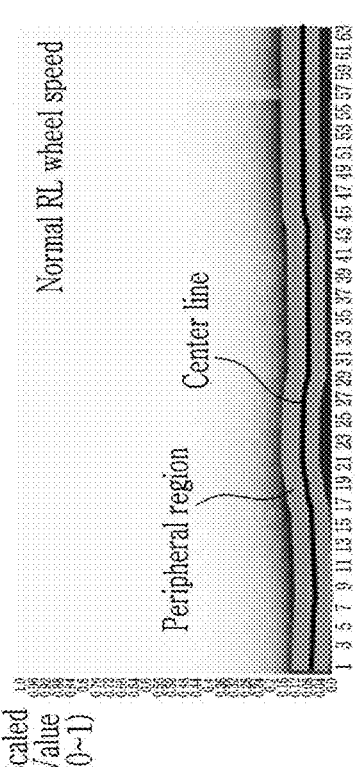
FIG. 7 is a drawing for explaining a normal trend figure model according to an embodiment.

FIG. 7 is a drawing for explaining the normal trend figure model according to an embodiment.

Referring to FIG. 7, the heatmap shown in the left side is for the normal rear-left (RL) wheel speed and shows that the normal trend figure model that includes the central line. The normal trend figure model may also include the peripheral region formed around the central line to have the predetermined width and to extend along the central line. The normal trend figure model has a shape extending along the axis corresponding to the frequency index and is generated by the learning module 150.

The heatmap shown in the right side is for suspension rear-left (RL) wheel leakage rear-left (RL) wheel speed, where the normal trend figure model generated by the learning module 150 shown in the left is overlapped. As indicated by a rectangle, a case in which values having a significant error among values of the heatmap are included at a certain level or more may be interpreted as an abnormality or a possibility of failure.

Figure 8:
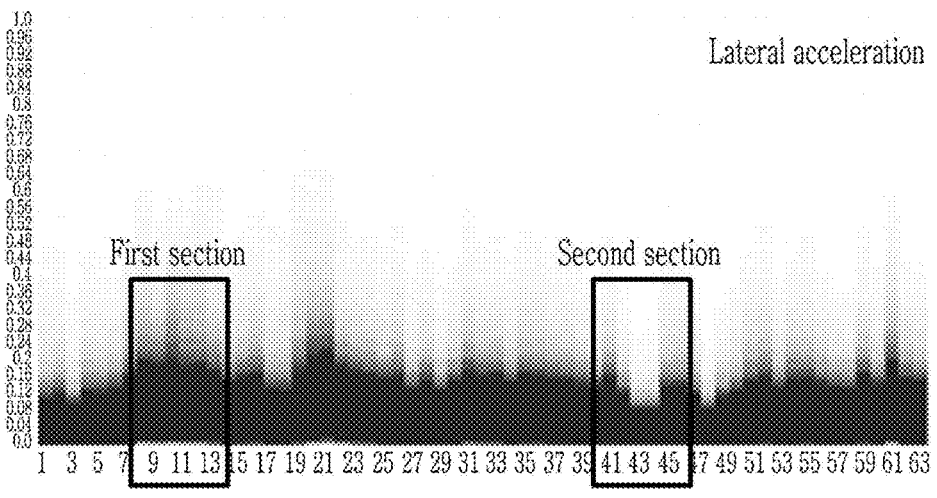
FIG. 8 is a drawing for explaining a normal trend figure model according to an embodiment.

FIG. 8 is a drawing for explaining the normal trend figure model according to an embodiment.

Referring to FIG. 8, the heatmap is for the lateral acceleration, where the first section and the second section may be set along the axis corresponding to the frequency index. The normal trend figure model may be represented as the first figure of shape having the first thickness in the first section and extending along the axis corresponding to the frequency index. The second figure of a shape having the second thickness different from the first thickness in the second section and extending along the axis corresponding to the frequency index.

Meanwhile, the alpha value may also be set to include the first alpha value determined corresponding to the first section, and the second alpha value determined corresponding to the second section but to be different from the first alpha value.

Figure 9:
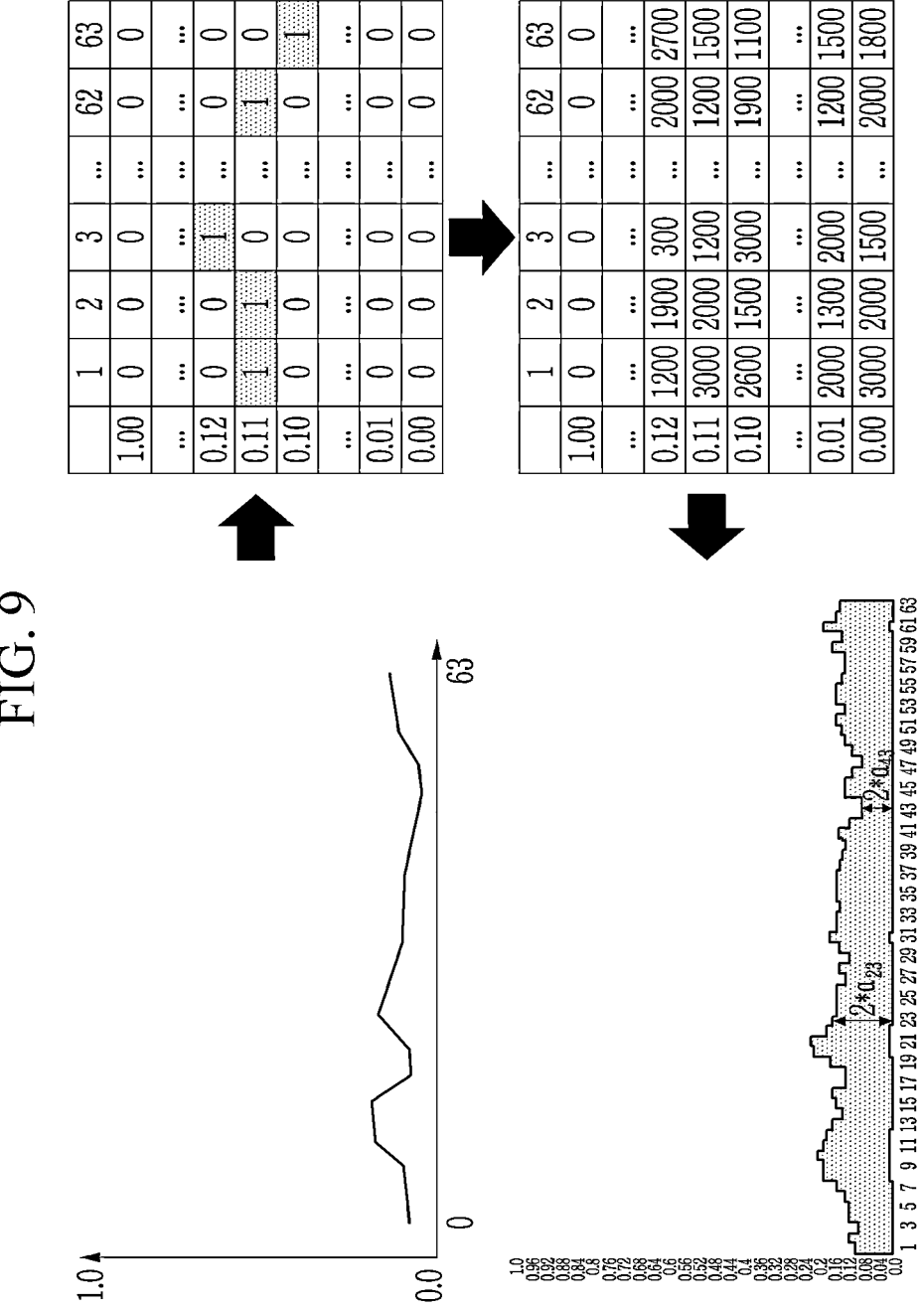
FIG. 9 is a drawing for explaining a normal trend figure model according to an embodiment.

FIG. 9 is a drawing for explaining the normal trend figure model according to an embodiment.

Referring to FIG. 9, after converting the heatmap to the graph having the binary color according to the predetermined ratio, the normal trend figure model according to an embodiment may be set based on the converted graph.

The value of the vertical axis, i.e., the scaled value, may be discretized, with respect to the graph obtained after the feature obtained by the feature acquisition module 120 is scaled to a value of the predetermined range (the graph shown in the upper left corner in FIG. 9). For example, the vertical axis may be divided into the plurality of sections having the same size, the first value (e.g., 1) may be assigned to a section of the plurality of sections to which the scaling value belongs, and the second value (e.g., 0) may be assigned to a section to which the scaling value does not belong, to generate the first table. For example, the value of the vertical axis corresponding to the frequency index of 1 may be 0.11x (x is an integer), the value of the vertical axis corresponding to the frequency index of 3 may be 0.12x (x is an integer), and the value of the vertical axis corresponding to the frequency index of 63 may be 0.10x (x is an integer). In this case, in a column corresponding to the frequency index of 1, 1 may be assigned to a section indicated by "0.11", and 0 may be assigned to the remaining sections. In the case of a column corresponding to the frequency index of 3, 1 may be assigned to a section indicated by "0.12", and 0 may be assigned to a remaining section. In the case of a column corresponding to the frequency index of 63, 1 may be assigned to a section indicated by "0.10", and 0 may be assigned to a remaining section.

Thereafter, the second table, the third table, . . . , and the k-th table (k is an integer greater than or equal to 2) may be generated by repeating the above-described operation with respect to another feature values obtained based on newly collected data and scaled. For each of these tables, the operation may be performed in the same manner as in generating the first table.

Subsequently, when the first table, the second table, . . . , and the k-th table are superposed, for items where the plurality of sections and the frequency index cross each other in the table, frequency counts of items in the same position of the first table, the second table, . . . , and the k-th table may be summed up. For example, in a column corresponding to the frequency index of 1, the frequency count of the section indicated by "0.11" and "0.00" may be 3000, which is the largest, the frequency count of the section indicated by "0.10" may be 2600, the frequency count of the section indicated by "0.01" may be 2000, and the frequency count of the section indicated by "0.12" may be 1200. At this time, a black color may be assigned to items having values above the predetermined ratio (for example, 3%) for respective items based on the same index or may be assigned to items having values above the predetermined threshold values (for example, 100) for respective items. A white color may be assigned to items having values less than the predetermined ratio or the predetermined threshold value. As this operation is repeated, the heatmap shown in the lower left corner of FIG. 9 may be finally generated.

Figure 10:
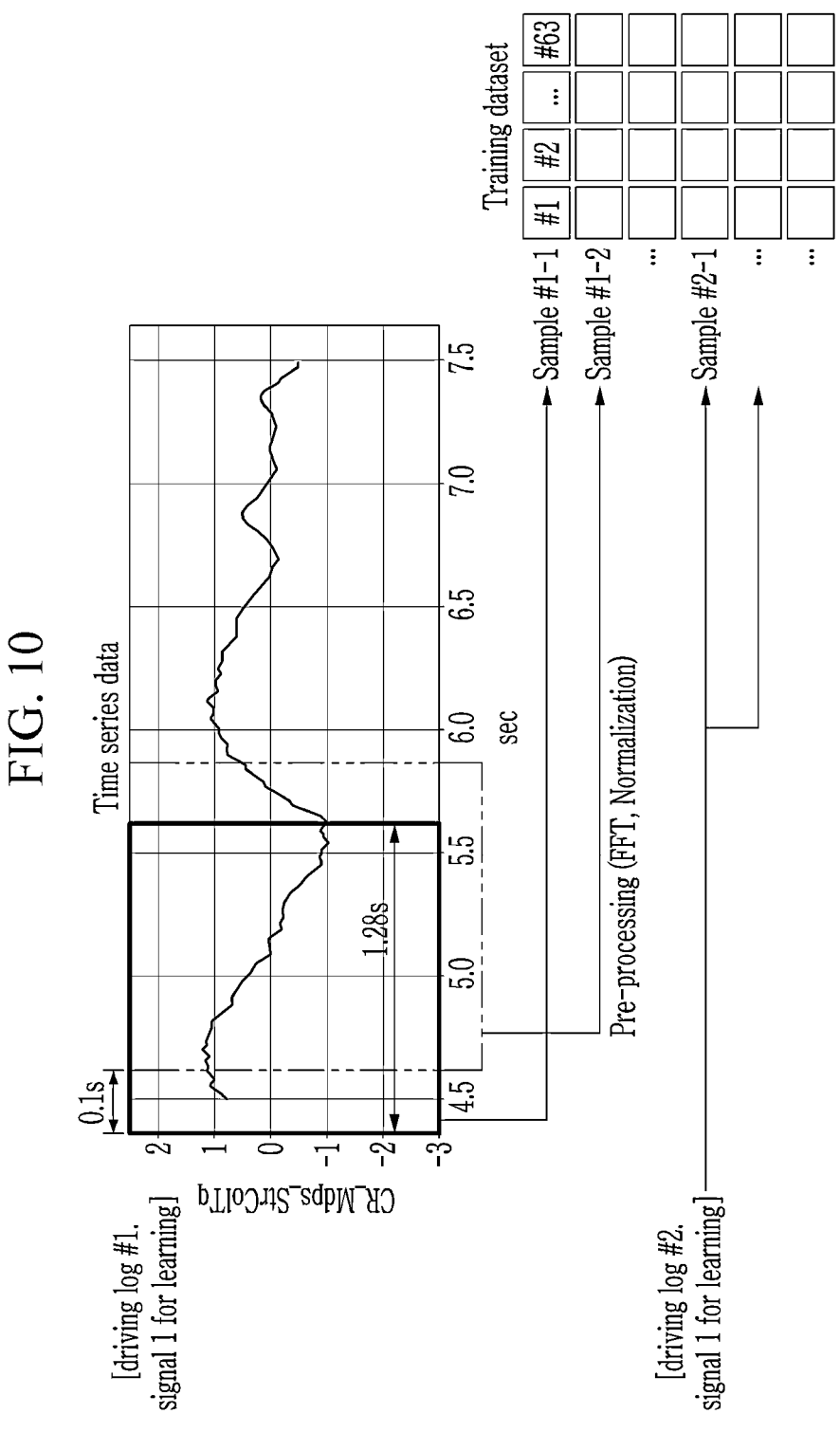
FIG. 10 is a drawing for explaining a learning module according to an embodiment.

FIG. 10 is a drawing for explaining a learning module according to an embodiment.

Referring to FIG. 10, the learning module 150 prepares the training data set for each the sensor signal and does not mix and use different sensor signals. With respect to a signal 1 corresponding to a first driving log for learning, specifically, the learning module 150 may extract and pre-process samples with respect to a first window to add them to the training data set (Sample #1-1) and then may extract and pre-process samples with respect to a second window shifted by 0.1 seconds to add them to the training data set (Sample #1-2). On the other hand, with respect to the signal 1 corresponding to a second driving log for learning, the learning module 150 may extract and pre-process samples with respect to a third window to add them to the training data set (Sample #2-1) and then may extract and pre-process samples with respect to a fourth window shifted by a predetermined time to add them to the training data set (Sample #2-2).

This process is a process of generating data for learning and is intended to concatenate and use data for each signal for a plurality of learning logs. The reason for concatenating and using a plurality of them is to learn a wide range of normal states that may occur in various situations by collecting and learning normal data for various possible driving circumstances. Meanwhile, the reason for learning separately for each signal is that the heatmap for each signal is different from the beginning, and through this, an effect of improving accuracy of abnormality determination may be obtained. For example, for some abnormal data, if the learning model for signal 1 determines the data to be normal, but the learning model for signal 2 determines the data to be abnormal, the final result may be determined to be abnormal according to a logical sum OR operation of these two results. This is because an abnormality does not affect one behavior of the vehicle (signal 1) but may affect another behavior (signal 2).

Figure 11:
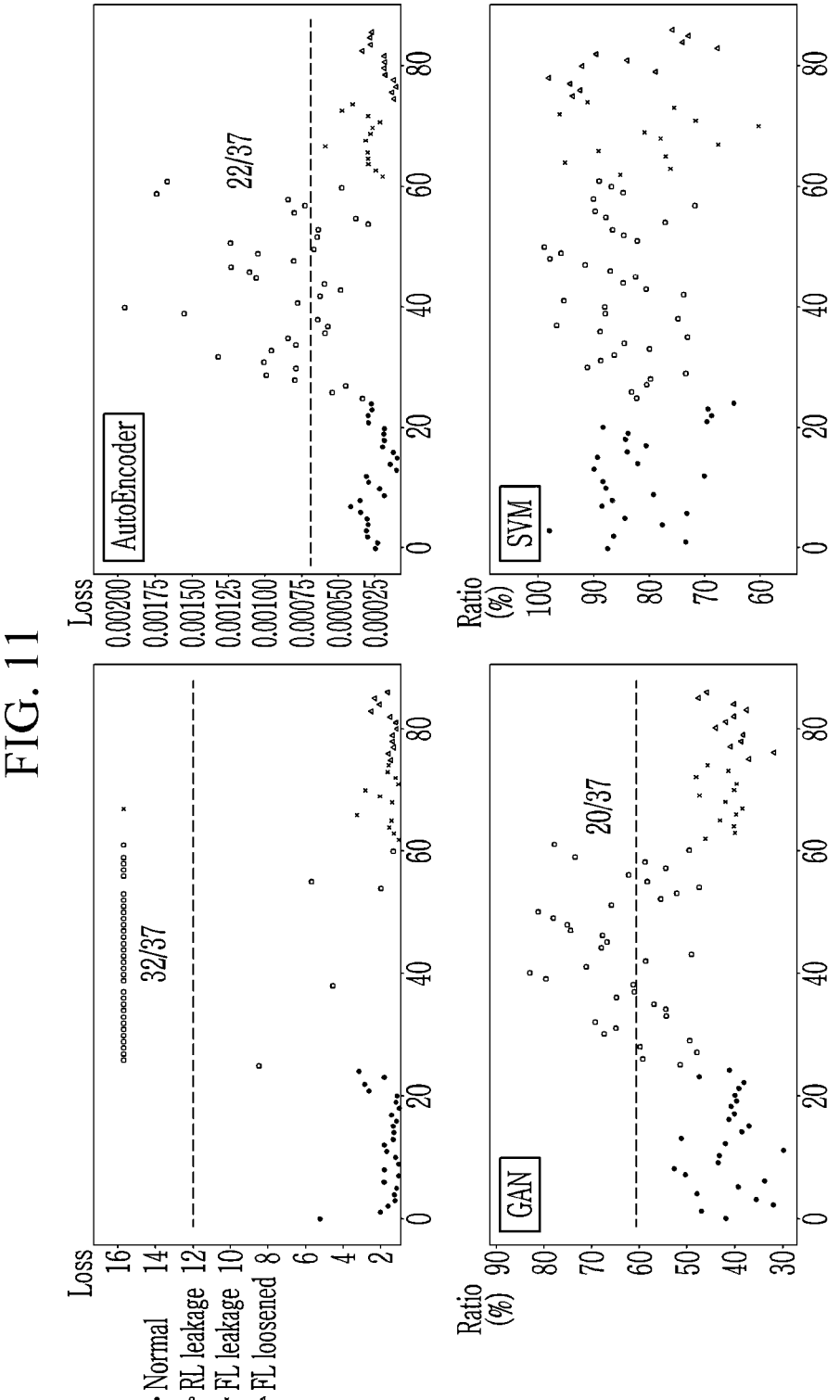
FIG. 11, FIG. 12, and FIG. 13 are drawings showing results of comparing performance related to a method and an apparatus for diagnosing a failure according to embodiments.
Figure 12:
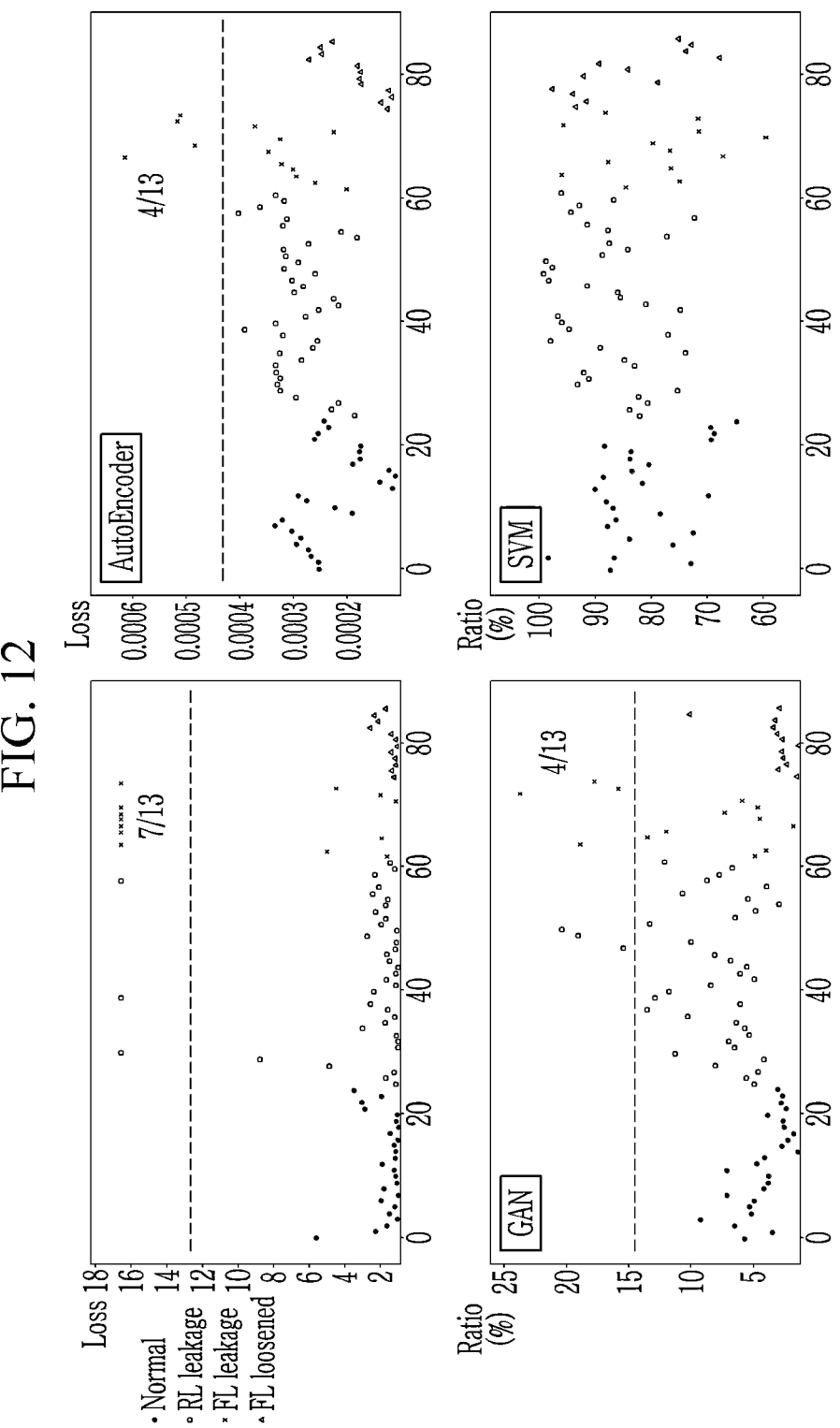
Figure 13:
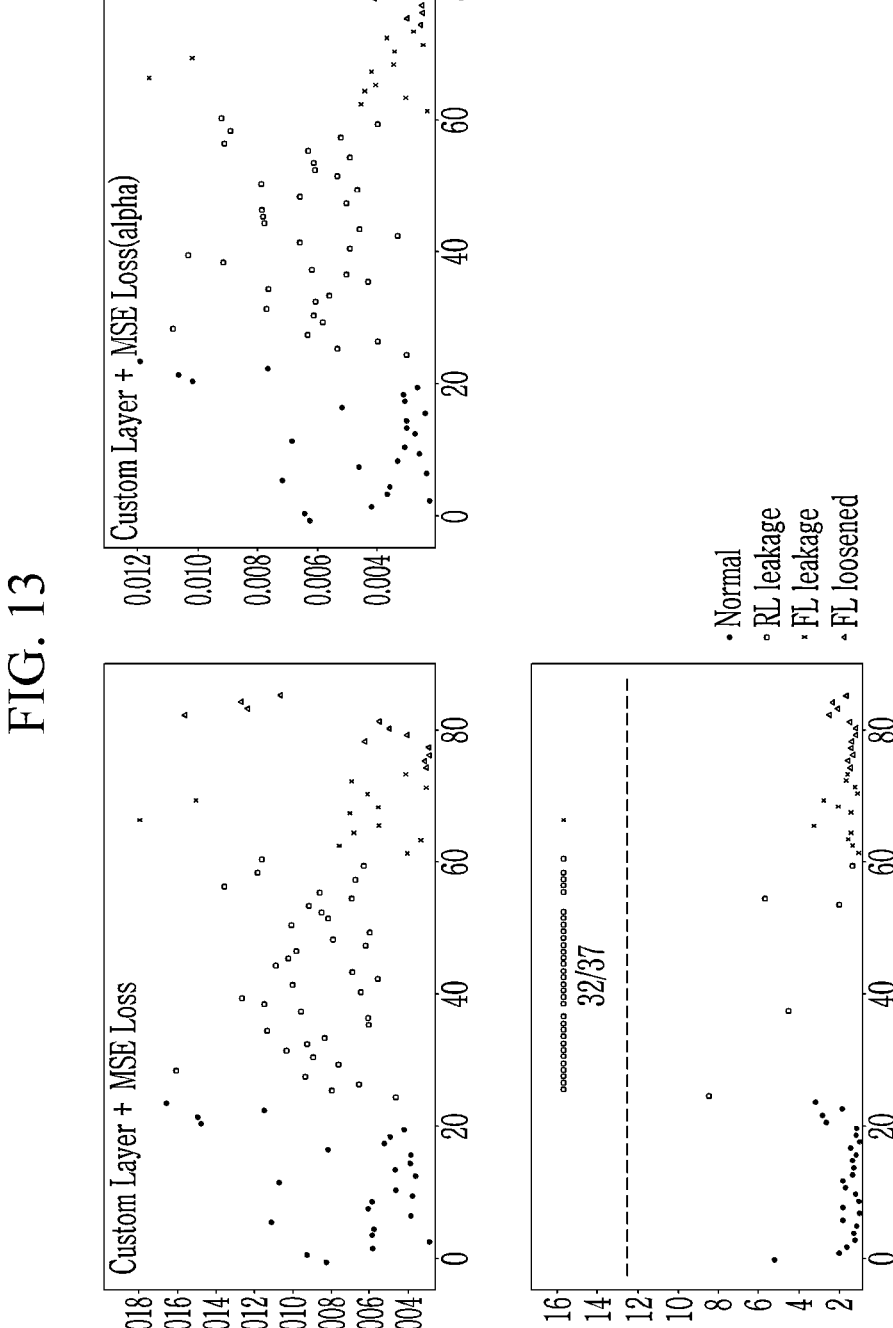

FIG. 11, FIG. 12, and FIG. 13 are drawings showing results of comparing performance related to a method and an apparatus for diagnosing a failure according to embodiments.

Failure diagnosis performance of a method and an apparatus for diagnosing a failure according to embodiments showed superior accuracy than autoencoder, GAN, and 1-Class SVM, and the following results for determination accuracy for suspension RL leakage and determination accuracy for suspension FL leakage have been derived.

TABLE 1

| Learning model | Suspension RL leakage determination accuracy | Suspension FL leakage determination accuracy | Required memory size |
|---|---|---|---|
| Embodiment | 86% | 54% | 1 |
| Autoencoder | 60% | 31% | 101.8 |
| GAN | 54% | 31% | 2154.7 |
| 1-Class SVM | 0% | 0% | 1621 |

The result according to an embodiment showed determination accuracy 86% for suspension RL leakage and determination accuracy 54% for suspension FL leakage, which is excellent compared to autoencoder, GAN, and 1-Class SVM, with the required memory size of 1, which is the same as the input feature.

FIG. 11 shows the results on suspension RL leakage, where 32 pieces of data among 37 pieces of data are detected as abnormal data for suspension RL leakage, only 22 pieces of data for the autoencoder and only 20 pieces of data for GAN were accurately detected, and in the case of SVM, the detection was not performed properly.

FIG. 12 shows the results on suspension FL leakage, where seven data among 13 pieces of data are detected as abnormal data for suspension FL leakage, only 4 pieces of data were accurately detected in the case of autoencoder and GAN, and in the case of SVM, the detection was not performed properly.

FIG. 13 shows performance of the loss function described above in connection with FIG. 1, the case of using the loss function as in embodiments (shown in the lower side of FIG. 13) showed better performance than the case of using the mean square error (MSE) (shown in the upper side of FIG. 13).

Figure 14:
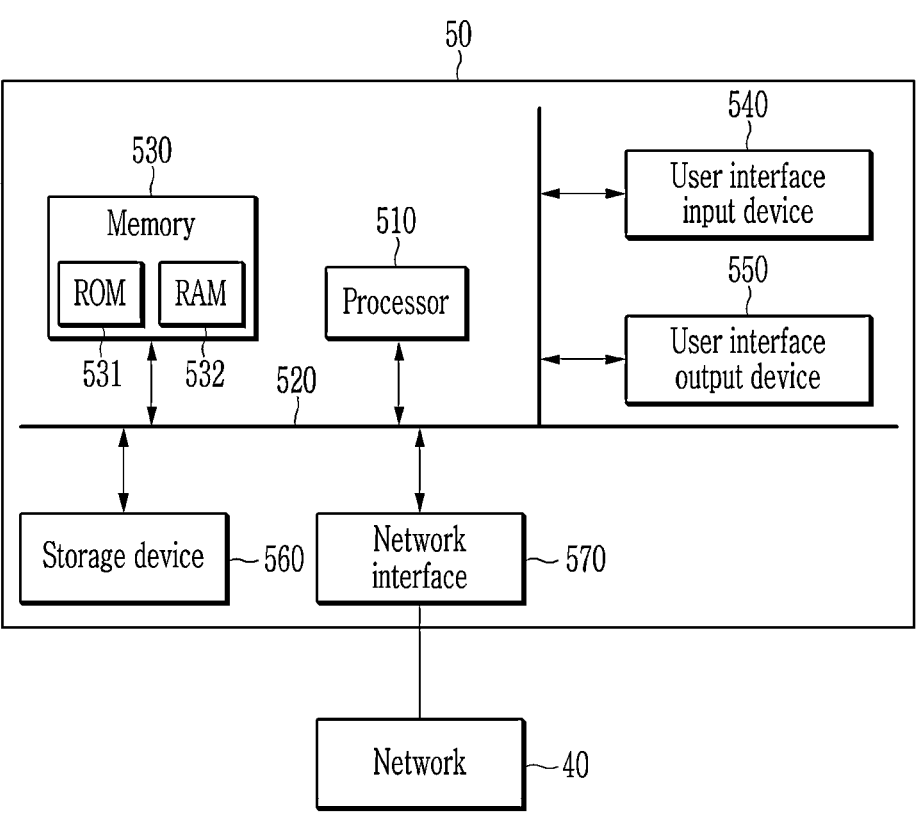
FIG. 14 is a drawing for explaining a computing device according to an embodiment.

FIG. 14 is a drawing for explaining a computing device according to an embodiment.

Referring to FIG. 14, a method and an apparatus for diagnosing a failure according to embodiments may be implemented by using a computing device 50.

The computing device 50 may include at least one of a processor 510, a memory 530, a user interface input device 540, a user interface output device 550, or a storage device 560. The elements may communicate with each other through a bus 520. The computing device 50 may include a network interface 570 electrically connected to a network 40. The network interface 570 may send or receive signals to and from other entities through the network 40.

The processor 510 may be implemented in various types, such as a micro controller unit (MCU), an application processor (AP), a central processing unit (CPU), a graphic processing unit (GPU), a neural processing unit (NPU), and the like. The processor 510 may be any semiconductor device configured to execute instructions stored in the memory 530 or the storage device 560. The processor 510 may be configured to implement function and methods described above with reference to FIG. 1-FIG. 13.

The memory 530 and the storage device 560 may include various types of volatile or non-volatile storage media. For example, the memory may include a read-only memory (ROM) 531 and a random access memory (RAM) 532. In the present embodiment, the memory 530 may be positioned in an interior or exterior of the processor 510, and the memory 530 may be connected to the processor 510 through various known means.

In some embodiments, at least some configuration or function of a method and an apparatus according to embodiments may be implemented as a program or software executed by the computing device 50, and the program or software may be stored in a computer-readable medium.

In some embodiments, at least some configuration or function of a method and apparatus according to embodiments may be implemented by using hardware or circuitry of the computing device 50 or may also be implemented by using separate hardware or circuitry that may be electrically connected to the computing device 50.

According to an embodiment described above, after a heatmap for each sensor signal of a vehicle is configured, based on a normal trend figure model that represents a trend of the data as a figure through the unsupervised learning by using only data representing normal states, a failure of the vehicle may be diagnosed with high accuracy by using a small memory, and a new type of failure may also be detected. In addition, as a very small-sized model, it is advantageous for mass production, and a failure diagnosis function may be added without the need to separately prepare additional hardware.

While this disclosure has been described in connection with what is presently considered to be practical embodiments, it should be understood that the disclosure is not limited to the disclosed embodiments but is intended to cover various modifications and equivalent arrangements included within the spirit and scope of the appended claims.

What is claimed is:

1. A method for diagnosing a failure of a vehicle, comprising:

collecting, through a controller area network (CAN), sensor signals related to a vehicle in a form of time series data;

for each sensor signal:

obtaining frequency-domain feature values classified into a predetermined number of frequency indices by performing a Fourier transform on a predetermined time interval among the time series data;

scaling the frequency-domain feature values to a predetermined numerical range;

generating a graph based on the scaled feature values with respect to the frequency indices;

generating a heatmap from the graph;

training, using only normal driving data, a normal trend figure model that represents a trend of data indicating a normal state in the heatmap as a figure having a predetermined thickness and extending along an axis corresponding to the frequency indices;

setting a threshold for the sensor signal based on normal test data;

estimating a loss for continuous driving data of the vehicle for a predetermined time unit based on deviation of data represented in the heatmap from the normal trend figure model; and determining whether there is a failure of the vehicle when the estimated loss exceeds the threshold.

2. The method of claim 1, wherein the normal trend figure model is represented as a figure having a shape having a uniform thickness and extending along an axis corresponding to the frequency index.

3. The method of claim 2, wherein the figure comprises a central line extending along the axis corresponding to the frequency index and comprises a peripheral region formed around the central line to have a predetermined width and to extend along the central line.

4. The method of claim 2, wherein:

a first section and a second section are set along the axis corresponding to the frequency index;

the normal trend figure model is represented as a first figure of a shape having a first thickness in the first section and extending along the axis corresponding to the frequency index; and the normal trend figure model is represented as a second figure of a shape having a second thickness different from the first thickness in the second section and extending along the axis corresponding to the frequency index.

5. The method of claim 1, wherein the sensor signals comprise sensor signals related to at least one of a wheel speed, a longitudinal acceleration, a lateral acceleration, a vertical direction acceleration, a yaw rate, a roll rate, a pitch rate, a steering wheel angle, a steering wheel angular speed, or a vehicle sound.

6. The method of claim 5, wherein collecting the sensor signals comprises collecting the sensor signals through a controller area network (CAN), wherein the CAN comprises at least one of a chassis CAN (C-CAN), a gateway CAN (G-CAN), or a powertrain CAN (P-CAN).

7. The method of claim 5, wherein collecting the sensor signals comprises collecting sound generated in the vehicle through a recording device.

8. The method of claim 1, wherein scaling comprises converting the feature to have a minimum value of 0 and a maximum value of 1 through minimum-maximum (Min–Max) normalization.

9. The method of claim 1, wherein the time series data comprises only normal driving data, and the normal trend figure model is trained based on the normal driving data.

10. The method of claim 1, wherein the loss is calculated by a loss function expressed as an equation of $$\begin{cases} 0 & \text{if } |y_i - \hat{y}_i| < \alpha_i \\ e^{10*|y_i-\hat{y}_i|} & \text{otherwise} \end{cases}$$

wherein, $y_i$ is an output value, $\hat{y}_i$ is a prediction value, and $\alpha_i$ is a predetermined alpha value.

11. The method of claim 10, wherein the heatmap is converted into a graph having a binary color according to a predetermined ratio, and the predetermined alpha value is determined based on the graph.

12. The method of claim 10, wherein:

a first section and a second section are set along an axis corresponding to the frequency index; and the predetermined alpha value comprises a first alpha value determined corresponding to the first section and comprises a second alpha value determined corresponding to the second section and different from the first alpha value.

13. A non-transitory computer-readable medium having a program or instructions recorded thereon, the program or instructions to direct a processor to perform acts of:

collecting sensor signals related to a vehicle in a form of time series data;

for each sensor signal:

obtaining frequency-domain feature values classified into a predetermined number of frequency indices by performing a Fourier transform on a predetermined time interval among the time series data;

scaling the frequency-domain feature values to a predetermined numerical range;

generating a graph based on the scaled feature values with respect to the frequency indices;

generating a heatmap from the graph;

training, using only normal driving data, a normal trend figure model that represents a trend of data indicating a normal state in the heatmap as a figure having a predetermined thickness and extending along an axis corresponding to the frequency indices;

setting a threshold for the sensor signal based on normal test data;

estimating a loss for continuous driving data of the vehicle for a predetermined time unit based on deviation of data represented in the heatmap from the normal trend figure model; and determining whether there is a failure of the vehicle when the estimated loss exceeds the threshold.

14. An apparatus for diagnosing a failure of a vehicle, the apparatus comprising:

a non-transitory computer-readable medium to store instructions;

a processor configured, by executing the instructions, to:

collect, through a controller area network (CAN), sensor signals related to a vehicle in a form of time series data;

for each sensor signal:

obtain frequency-domain feature values classified into a predetermined number of frequency indices by performing a Fourier transform on a predetermined time interval among the time series data;

scale the frequency-domain feature values to a predetermined numerical range;

generate a graph based on the scaled feature values with respect to the frequency indices and generate a heatmap from the graph;

train, using only normal driving data, a normal trend figure model that represents a trend of data indicating a normal state in the heatmap as a figure having a predetermined thickness and extending along an axis corresponding to the frequency indices;

setting a threshold for the sensor signal based on normal test data;

estimating a loss for continuous driving data of the vehicle for a predetermined time unit based on deviation of data represented in the heatmap from the normal trend figure model; and determine whether there is a failure of the vehicle when the estimated loss exceeds the threshold.

15. The apparatus of claim 14, wherein the normal trend figure model is represented as a figure having a shape having a uniform thickness and extending along an axis corresponding to the frequency index.

16. The apparatus of claim 15, wherein the figure comprises a central line extending along the axis corresponding to the frequency index and comprises a peripheral region formed around the central line to have a predetermined width and to extend along the central line.

17. The apparatus of claim 15, wherein:

a first section and a second section are set along the axis corresponding to the frequency index;

the normal trend figure model is represented as a first figure of a shape having a first thickness in the first section and extending along the axis corresponding to the frequency index; and the normal trend figure model is a second figure of a shape having a second thickness different from the first thickness in the second section and extending along the axis corresponding to the frequency index.

18. The apparatus of claim 14, wherein the loss is calculated by a loss function expressed as an equation of $$\begin{cases} 0 & \text{if } |y_i - \hat{y}_i| < \alpha_i \\ e^{10*|y_i - \hat{y}_i|} & \text{otherwise} \end{cases}$$

wherein, $y_i$ is an output value, $\hat{y}_i$ is a prediction value, and $\alpha_i$ is a predetermined alpha value.

19. The apparatus of claim 18, wherein the heatmap is converted into a graph having a binary color according to a predetermined ratio, and the predetermined alpha value is determined based on the graph.

20. The apparatus of claim 18, wherein:

first section and a second section are set along an axis corresponding to the frequency index; and the predetermined alpha value comprises a first alpha value determined corresponding to the first section and comprises a second alpha value determined corresponding to the second section and different from the first alpha value.

\* \* \* \* \*